(12) United States Patent
Carreira et al.

(10) Patent No.: US 12,254,693 B2
(45) Date of Patent: *Mar. 18, 2025

(54) ACTION CLASSIFICATION IN VIDEO CLIPS USING ATTENTION-BASED NEURAL NETWORKS

(71) Applicant: DeepMind Technologies Limited, London (GB)

(72) Inventors: Joao Carreira, St Albans (GB); Carl Doersch, London (GB); Andrew Zisserman, London (GB)

(73) Assignee: DeepMind Technologies Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/375,941

(22) Filed: Oct. 2, 2023

(65) Prior Publication Data

US 2024/0029436 A1 Jan. 25, 2024

Related U.S. Application Data

(63) Continuation of application No. 17/295,329, filed as application No. PCT/EP2019/081877 on Nov. 20, 2019, now Pat. No. 11,776,269.

(Continued)

(51) Int. Cl.
*G06V 20/40* (2022.01)
*G06N 3/045* (2023.01)
*G06V 10/25* (2022.01)

(52) U.S. Cl.
CPC ............. *G06V 20/46* (2022.01); *G06N 3/045* (2023.01); *G06V 10/25* (2022.01); *G06V 20/41* (2022.01)

(58) Field of Classification Search
CPC ........ G06V 20/46; G06V 10/25; G06V 20/41; G06V 10/82; G06V 20/40; G06V 40/20; G06N 3/045
See application file for complete search history.

(56) References Cited

U.S. PATENT DOCUMENTS 10,089,556 B1 10/2018 Xu
11,003,949 B2 * 5/2021 Lan ...................... G06V 20/41
(Continued)

FOREIGN PATENT DOCUMENTS

| CN | 107273800 A | 10/2017 |
| CN | 107960125 A | 4/2018 |
| CN | 108027885 A | 5/2018 |

OTHER PUBLICATIONS

Abu-El-Haija et al., "Youtube-8m: A large-scale video classification benchmark," Google Research, arXiv preprint arXiv:1609.08675, Sep. 2016, 10 pages.
(Continued)

*Primary Examiner* — Santiago Garcia
(74) *Attorney, Agent, or Firm* — Fish & Richardson P.C.

(57) ABSTRACT

Methods, systems, and apparatus, including computer programs encoded on computer storage media, for classifying actions in a video. One of the methods obtaining a feature representation of a video clip; obtaining data specifying a plurality of candidate agent bounding boxes in the key video frame; and for each candidate agent bounding box: processing the feature representation through an action transformer neural network.

18 Claims, 3 Drawing Sheets

Related U.S. Application Data

(60) Provisional application No. 62/770,096, filed on Nov. 20, 2018.

(56) References Cited

U.S. PATENT DOCUMENTS

| | | | | |
|---|---|---|---|---|
| 11,048,973 | B1* | 6/2021 | Ramanathan | G06V 10/774 |
| 11,106,903 | B1* | 8/2021 | Huynh | G06V 10/82 |
| 11,599,769 | B2* | 3/2023 | Fang | G06F 16/252 |
| 2016/0171852 | A1* | 6/2016 | Lin | G06V 20/52 |
| | | | | 382/103 |
| 2017/0286809 | A1 | 10/2017 | Pankanti et al. | |
| 2018/0075290 | A1 | 3/2018 | Chen et al. | |
| 2018/0137892 | A1* | 5/2018 | Ding | G11B 27/031 |
| 2018/0174046 | A1* | 6/2018 | Xiao | G06F 18/24133 |
| 2019/0108399 | A1* | 4/2019 | Escorcia | G06F 18/24 |
| 2019/0180149 | A1* | 6/2019 | Knittel | G06V 40/20 |
| 2020/0019921 | A1* | 1/2020 | Buibas | G06T 19/003 |
| 2021/0034905 | A1* | 2/2021 | Lee | G06N 3/08 |
| 2021/0067744 | A1* | 3/2021 | Buibas | G06F 3/012 |
| 2021/0133468 | A1* | 5/2021 | Chen | G06N 3/08 |
| 2021/0142047 | A1* | 5/2021 | Sengupta | G06V 40/172 |

OTHER PUBLICATIONS

Activity-net.org [online], "Activitynet leaderboard," 2018, retrieved on May 25, 2021, retrieved from URL<http://activity-net.org/challenges/2018/evaluation.html>, 5 pages.
Ba et al., "Layer normalization," Machine Learning, arXiv preprint arXiv:1607.06450, Jul. 2016, 14 pages.
Baradel et al., "Human action recognition: Pose-based attention draws focus to hands," Proceedings of the IEEE International Conference on Computer Vision Workshops, 2017, 10 pages.
Baradel et al., "Human activity recognition with pose-driven attention to rgb," BMVC 2018—29th British Machine Vision Conference, Sep. 2018, 15 pages.
Baradel et al., "Object level visual reasoning in videos," Proceedings of the European Conference on Computer Vision (ECCV), 2018, 17 pages.
Blank et al., "Actions as space-time shapes," Tenth IEEE International Conference on Computer Vision, Oct. 2005, 8 pages.
Carreira et al., "Quo vadis, action recognition? a new model and the kinetics dataset," Proceedings of the IEEE Conference on Computer Vision and Pattern Recognition, 2017, 10 pages.
Duarte et al., "Videocapsulenet: A simplified network for action detection," Center for Research in Computer Vision, arXiv preprint arXiv:1805.08162, May 2018, 18 pages.
Girdhar et al., "Actionvlad: Learning spatio-temporal aggregation for action classification," Proceedings of the IEEE Conference on Computer Vision and Pattern Recognition, 2017, 10 pages.
Girdhar et al., "Attentional pooling for action recognition," The Robotics Institute, Carnegie Mellon University, arXiv preprint arXiv:1711.01467, Nov. 2017, 12 pages.
Girdhar et al., "Detect-and-track: Efficient pose estimation in video," Proceedings of the IEEE Conference on Computer Vision and Pattern Recognition, 2018, 10 pages.
Girdhar et al., "Video action transformer network," Proceedings of the IEEE/CVF Conference on Computer Vision and Pattern Recognition, 2019, 10 pages.
Goyal et al., "Accurate, large minibatch sgd: Training imagenet in 1 hour," Computer Vision and Pattern Recognition, arXiv preprint arXiv:1706.02677, Jun. 2017, 12 pages.
Gu et al., "Ava: A video dataset of spatio-temporally localized atomic visual actions," Proceedings of the IEEE Conference on Computer Vision and Pattern Recognition, 2018, 10 pages.
He et al., "Deep residual learning for image recognition," Proceedings of the IEEE Conference on Computer Vision and Pattern Recognition, 2016, 9 pages.
He et al., "Mask r-cnn," Computer Vision and Pattern Recognition, Mar. 2017, 12 pages.
Herzig et al., "Spatio-temporal action graph networks," Proceedings of the IEEE/CVF International Conference on Computer Vision Workshops, 2019, 10 pages.
Hou et al., "Tube convolutional neural network (t-cnn) for action detection in videos," Proceedings of the IEEE International Conference on Computer Vision, 2017, 10 pages.
Huang et al., "Speed/accuracy trade-offs for modern convolutional object detectors," Proceedings of the IEEE Conference on Computer Vision and Pattern Recognition, 2017, 10 pages.
Jaderberg et al., "Spatial transformer networks," Computer Vision and Pattern Recognition, arXiv preprint arXiv:1506.02025, Jun. 2015, 15 pages.
Jhuang et al., "Towards understanding action recognition," Proceedings of the IEEE International Conference on Computer Vision, 2013, 8 pages.
Jiang et al., "Human centric spatio-temporal action localization," Technical Report, Tsinghua University, 2018, 4 pages.
Kalogeiton et al., "Action tubelet detector for spatio-temporal action localization," Proceedings of the IEEE International Conference on Computer Vision, 2017, 9 pages.
Karpathy et al., "Large-scale video classification with convolutional neural networks," Proceedings of the IEEE Conference on Computer Vision and Pattern Recognition, 2014, 8 pages.
Kay et al., "The kinetics human action video dataset," Computer Vision and Pattern Recognition, arXiv preprint arXiv:1705.06950, May 2017, 22 pages.
Kuehne et al., "HMDB: a large video database for human motion recognition," International Conference on Computer Vision, Nov. 2011, 9 pages.
Laptev et al., On space-time interest points, International Journal of Computer Vision, Sep. 2005, 22 pages.
Lin et al., "Feature pyramid networks for object detection," Proceedings of the IEEE Conference on Computer Vision and Pattern Recognition, 2017, 9 pages.
Long et al., "Attention clusters: Purely attention based local feature integration for video classification," Proceedings of the IEEE Conference on Computer Vision and Pattern Recognition, 2018, 10 pages.
Miech et al., Learnable pooling with context gating for video classification, Machine Learning, arXiv preprint arXiv:1706.06905, Jun. 2017, 8 pages.
Office Action in Chinese Appln. No. 201980075305, dated Aug. 22, 2023, 14 pages (with English translation).
Parmar et al., "Image transformer," Computer Vision and Pattern Recognition, Feb. 2018, 10 pages.
PCT International Preliminary Report on Patentability in International Appln. No. PCT/EP2019/081877, dated Nov. 20, 2018, 8 pages.
PCT International Search Report and Written Opinion in International Appln. No. PCT/EP2019/081877, dated Feb. 11, 2020, 15 pages.
Qiu et al., "Learning spatio-temporal representation with pseudo-3d residual networks," Proceedings of the IEEE International Conference on Computer Vision, 2017, 9 pages.
Ren et al., "Faster r-cnn: Towards real-time object detection with region proposal networks," Computer Vision and Pattern Recognition, arXiv preprint arXiv:1506.01497, Jun. 2015, 14 pages.
Ren et al., "Faster r-cnn: Towards real-time object detection with region proposal networks," Conference on Computer Vision and Pattern Recognition, arXiv preprint arXiv:1506.01497, Jun. 2015, 14 pages.
Santoro et al., "A simple neural network module for relational reasoning," DeepMind, arXiv preprint arXiv:1706.01427, Jun. 2017, 16 pages.
Schuldt et al., "Recognizing human actions: a local SVM approach," Proceedings of the 17th International Conference on Pattern Recognition, Aug. 2004, 5 pages.
Sharma et al., "Action recognition using visual attention," University of Toronto, arXiv preprint arXiv:1511.04119, Nov. 2015, 11 pages.
Sigurdsson et al., "Asynchronous temporal fields for action recognition," Proceedings of the IEEE Conference on Computer Vision and Pattern Recognition, 2017, 10 pages.

(56) References Cited

OTHER PUBLICATIONS

Sigurdsson et al., "Hollywood in homes: Crowdsourcing data collection for activity understanding," European Conference on Computer Vision, Oct. 2016, 17 pages.
Singh et al., "Online real-time multiple spatiotemporal action localisation and prediction," Proceedings of the IEEE International Conference on Computer Vision, 2017, 10 pages.
Soomro et al., "UCF101: A dataset of 101 human actions classes from videos in the wild," Center for Research in Computer Vision, arXiv preprint arXiv:1212.0402, Dec. 2012, 7 pages.
Sun et al., "Actor-centric relation network," Proceedings of the European Conference on Computer Vision (ECCV), 2018, 17 pages.
Tran et al., "A closer look at spatiotemporal convolutions for action recognition," Proceedings of the IEEE conference on Computer Vision and Pattern Recognition, 2018, 10 pages.
Vaswani et al., "Attention is all you need," University of Toronto, arXiv preprint arXiv:1706.03762, Jun. 2017, 15 pages.
Wang et al., "Action recognition with improved trajectories," Proceedings of the IEEE International Conference on Computer Vision, 2013, 8 pages.
Wang et al., "Non-local neural networks," Proceedings of the IEEE Conference on Computer Vision and Pattern Recognition, 2018, 10 pages.
Wang et al., "Temporal segment networks: Towards good practices for deep action recognition," European Conference on Computer Vision, Oct. 2016, 16 pages.
Wang et al., "Videos as space-time region graphs," Proceedings of the European conference on computer vision (ECCV), 2018, 19 pages.
Xie et al., "Rethinking spatiotemporal feature learning: Speed-accuracy trade-offs in video classification," Proceedings of the European Conference on Computer Vision (ECCV), 2018, 17 pages.
Xu et al., "R-c3d: Region convolutional 3d network for temporal activity detection," Proceedings of the IEEE international conference on computer vision, 2017, 10 pages.
Xu et al., "Show, attend and tell: Neural image caption generation with visual attention," International Conference on Machine Learning, Jun. 2015, 10 pages.
Yao et al., "Yh technologies at activitynet challenge 2018," YH Technologies Co., Ltd, Beijing, China, arXiv preprint arXiv:1807.00686, Jun. 2018, 6 pages.

* cited by examiner

ACTION CLASSIFICATION IN VIDEO CLIPS USING ATTENTION-BASED NEURAL NETWORKS

CROSS-REFERENCE TO RELATED APPLICATIONS

This application is a continuation of U.S. application Ser. No. 17/295,329, filed May 19, 2021, which is a National Stage Application under 35 U.S.C. § 371 and claims the benefit of International Application No. PCT/EP2019/081877, filed Nov. 20, 2019, which claims priority to U.S. Application No. 62/770,096, filed Nov. 20, 2018, entitled ACTION CLASSIFICATION IN VIDEO CLIPS USING ATTENTION-BASED NEURAL NETWORKS, the disclosures of which are incorporated herein by reference.

BACKGROUND

This specification relates to processing video data using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that classifies actions that are performed by one or more agents, e.g., one or more people or other animals or robots, depicted in a key video frame in a video. In particular, the system identifies a bounding box in the key video frame that likely depicts an agent and generates a set of classification scores that includes a respective score for each action in a set of possible actions. The score for a given action represents the likelihood that the agent depicted in the bounding box is performing the action in a video clip that includes the key video frame. The system can generate these action scores for multiple bounding boxes in the key video frame.

Particular embodiments of the subject matter described in this specification can be implemented so as to realize one or more of the following advantages.

The described systems effectively classify actions being performed by agents depicted in video clips. In particular, the described systems can effectively aggregate features from the spatiotemporal context (within the video clip) around the agent whose actions are being classified. This is accomplished by use of an attention mechanism that attends over a feature representation of the video clip using a query derived from features corresponding to a bounding box that depicts the agent whose actions are being classified. Additionally, the system can leverage this spatiotemporal context to improve the accuracy of the bounding box prediction. The system is able to both track individual people and to contextualize their actions in terms of the actions of other people in the video. Additionally, because the attention weights generated by the attention mechanism when attending to various portions of the feature representation defined which portions of the video clip influenced the action classification for any given agent, these attention weights can also be output to make the prediction of the neural network with respect to any given agent more interpretable. In other words, because the system makes action classifications using the described attention mechanism, the portions of the video that the system focused on when making any given prediction can be identified to users to allow users to better understand the reasons for the given prediction.

A classification result, obtained based on the action scores (e.g. as the action for which the action score is highest), can be used for example to generate a warning signal (e.g. particularly if the agent is human, a warning signal transmitted to the agent) if, according to the classification result, the agent is not performing a desired action and/or is performed an action which is not desired. Alternatively, it could be used as a control signal for controlling a system, e.g. in the environment of the agent, based on the action specified by the classification result. For example, if action is walking towards a door, the control signal may control the door to open.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
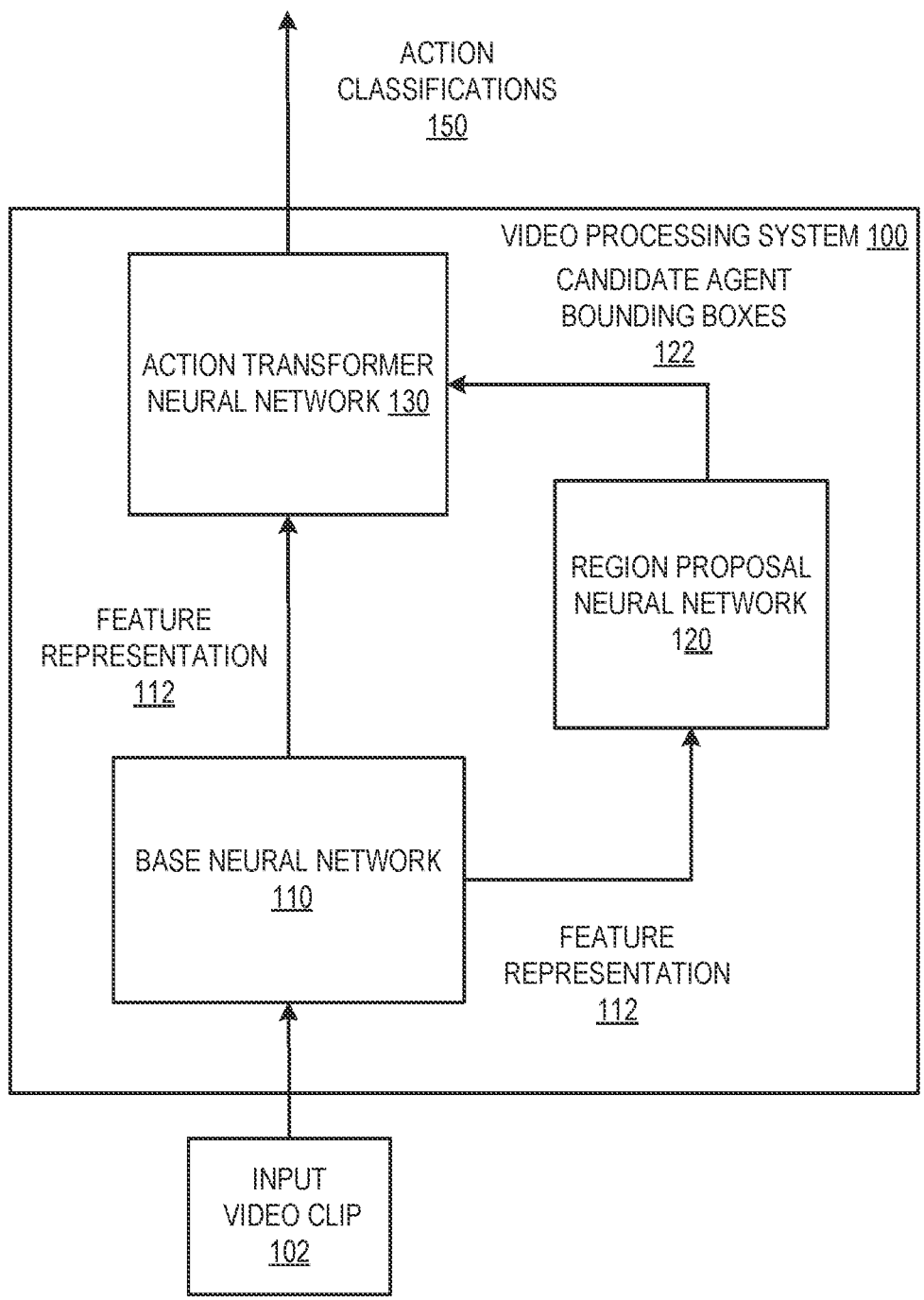
FIG. 1 shows an example video processing system.

FIG. 1 shows an example video processing system 100. The video processing system 100 is an example of a system implemented as computer programs on one or more computers in one or more locations in which the systems, components, and techniques described below are implemented.

The system 100 classifies actions that are performed by one or more agents, e.g., people or other animals or robots, depicted in a key video frame in a video. More specifically, the system 100 receives a video clip 102 and data identifying a key video frame in the video clip. The key frame in the video clip is surrounded by one or more other frames ("context video frames") in the video clip. The video clip may be captured by a video camera, and show at least part of an environment containing the agent(s).

To process the video clip 102, the system 100 identifies one or more bounding boxes in the key video frame that likely depict an agent and generates a set of action classification scores 150 for each bounding box that includes a respective score for each action in a set of possible actions. The score for a given action represents the likelihood that the agent depicted in the bounding box is performing the action in the video clip that includes the key video frame. The system can also generate a score for a "background" action that indicates that the bounding box either does not depict an agent or depicts a background agent that is not performing actions in the video. When there are multiple bounding boxes identified in the key video frame, the system 100 can generate these action scores for multiple bounding boxes in the key video frame.

In particular, the system 100 obtains a feature representation 112 of the video clip 102, i.e., the clip that includes the key video frame and one or more context video frames from the same video.

Generally, the feature representation 112 is a spatiotemporal feature representation. That is, the feature representation 112 includes multiple frames that each correspond to a different respective time period (e.g. respective non-overlapping time periods) in the video clip. Each frame in the feature representation 112 includes respective features for each of a plurality of spatial cells, with each spatial cell corresponding to a spatial region in the frames of the video clip.

A feature, as referred to in this specification, is an ordered collection of numeric values, e.g., a vector or a matrix of floating point values, fixed point values, or another type of numeric values.

In one example, when the video clip includes T video frames that have dimensions H×W, the feature representation includes T' video frames that have dimensions H'×W'. Generally, T' is less than T, H' is less than H, and W' is less than W. As a particular example, T' may equal T/4, H' may equal H/16, and W' may equal W/16.

In some implementations, the system 100 receives the feature representation 112 from an external system. In other implementations, the system 100 generates the feature representation using a "base" neural network 110. The neural network 110 is referred to as a "base" neural network because it serves as the base of the processing pipeline, i.e., because it generates the feature representation 112 that will then be used to classify actions.

The base neural network 110 may have any appropriate neural network architecture that allows the base neural network 110 to generate a spatio-temporal feature representation of an input video clip. For example, the neural network 110 may include a plurality of three-dimensional convolutional layers that reduce the spatial and temporal dimensions of the video clip to generate the feature representation (e.g., while increasing the number of dimensions of each of the features). As a particular example, the neural network 110 may be the initial layers of an I3D neural network. I3D neural networks are described further in J. Carreira and A. Zisserman. *Quo Vadis, Action Recognition? A new model and the kinetics dataset*. In CVPR, 2017.

The system 100 also obtains data 122 specifying a plurality of candidate agent bounding boxes in the key video frame. Each candidate agent bounding box is an initial estimate of a portion of the key video frame that depicts an agent. That is, each candidate agent bounding box is a region in the key video frame that may depict an agent.

In some implementations, the system obtains the bounding box data 122 from an external system. In some other implementations, the system generates the bounding box data 122 using a region proposal neural network 120. The region proposal neural network 120 is a neural network that is configured to receive a feature representation of a video frame (e.g. the feature representation 122) and to process the feature representation to generate data specifying a plurality of candidate agent bounding boxes (also referred to here as candidate bounding boxes) in the video frame and a respective objectness score for each candidate bounding box. The objectness score for a given candidate bounding box represents the likelihood that the bounding box depicts an agent.

To generate the bounding box data 122, the system 100 processes a frame in the representation 112 that temporally corresponds to the key video frame, i.e., that corresponds to the time period in the video clip that includes the key video frame, using the region proposal neural network 120. For example, when the key video frame is the temporally central frame in the input video clip 102, the system 100 can process the temporally-central frame in the feature representation 112 to generate the bounding box data 122.

The region proposal neural network 120 may have any appropriate neural network architecture that allows the region proposal neural network 120 to generate bounding boxes and objectness scores from an input feature representation. Example architectures for region proposal neural networks are described in S. Ren, K. He, R. Girshick, and J. Sun. Faster R-CNN: Towards real-time object detection with region proposal networks. In NIPS, 2015.

In some implementations, the system 100 selects only a subset of the candidate boxes generated by the region proposal neural network 120 for further processing. In particular, the system 100 can select a pre-determined number of candidate agent bounding boxes from the plurality of candidate bounding boxes generated by the region proposal neural network 120 based on the objectness scores, i.e. by selecting the bounding boxes having the highest objectness scores, for further processing.

For each candidate bounding box, the system 100 then generates action classification scores 150 and, optionally, data specifying a refined bounding box by processing the feature representation using an action transformer neural network 130.

The action transformer neural network 130 may include a stack of action transformer layers configured to process the feature representation 112 to generate a final feature vector for the candidate bounding box.

The action transformer neural network 130 may also include one or more classification output layers configured to process the final feature vector to generate a respective classification score for each action in the set of possible actions.

Optionally, the action transformer neural network 130 can also include one or more regression output layers configured to process the final feature vector for the candidate bounding box to generate data defining a final bounding box that is a refined estimate of the portion of the key video frame that depicts the agent.

The architecture of the action transformer neural network 130 is described in more detail below with reference to FIG. 2.

Figure 2:
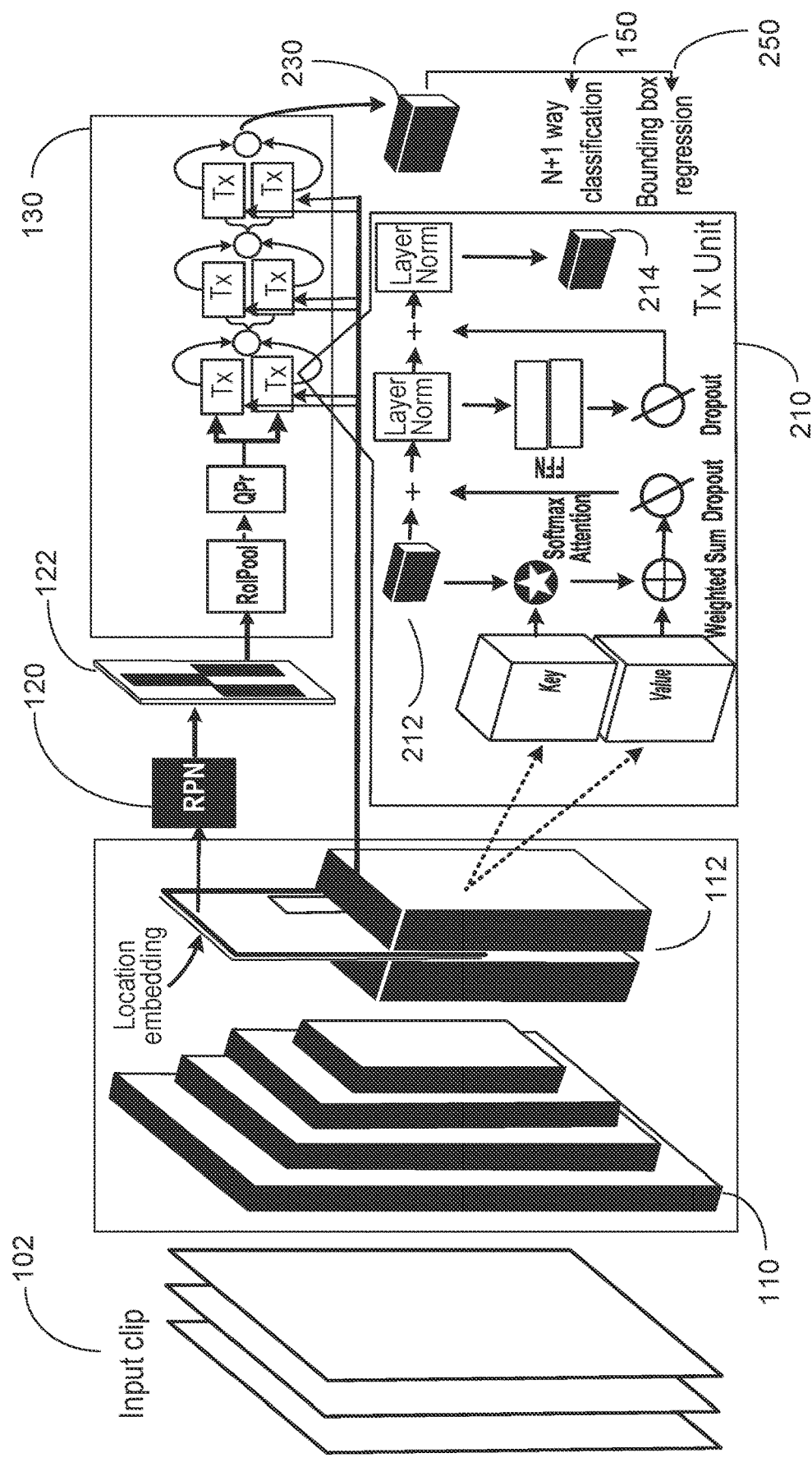
FIG. 2 illustrates an example architecture of the action transformer neural network.

FIG. 2 shows an example architecture of the action transformer neural network 130.

As shown in FIG. 2, the system receives the input video clip 102. While FIG. 2 shows three video frames being included in the input video clip, the video clip will generally include many more video frames that surround the key video frame in the video. For example, the video clip may include between 50 and 100 video frames from the video, including the key video frame.

The system processes the input video clip 102 through the base neural network 110 to generate the feature representation 112. As described above, this feature representation 112 may be a convolutional feature map, i.e., a set of frames, generated by the base neural network 110.

In some implementations, the system augments the convolutional feature map generated by the base neural network 110 with a location embedding to generate the feature representation 112. In other words, the system augments each feature in each frame in the feature representation with a location embedding that identifies the temporal position of the frame and, for each cell in the frame, the spatial position of the cell within the frame. As a particular example, the system can augment the feature for each cell by concatenating a vector that embeds (encodes) the spatial coordinates and the temporal location of the cell to which the feature corresponds in the feature representation 112.

The system then processes the frame of the feature representation corresponding to the key frame using the region proposal neural network 120 to generate the bounding box data 122 as described above with reference to FIG. 1.

For each candidate bounding box, the system 100 then generates action classification scores 150 and, optionally, data specifying a refined bounding box 250 by processing the feature representation using an action transformer neural network 130.

The action transformer neural network 130 includes a stack of action transformer layers configured to process the feature representation 112 to generate a final feature vector 230 for the candidate bounding box.

In particular, the action transformer neural network 130 generates an input query feature vector from the features for the candidate bounding box in the feature representation and then each action transformer layer updates the query feature vector using the feature representation 112 to generate final query features, i.e., the final feature vector 230.

In other words, the input query feature vector includes features corresponding to the candidate bounding box in the feature representation.

In the example of FIG. 2, to generate the input query feature vector, the action transformer neural network 130 extracts a region of interest (ROI) pooled feature for the candidate bounding box from the feature representation 112. Optionally, the neural network 130 can then process the ROI pooled feature using a query preprocessor followed by one or more linear neural network layers.

In some implementations, the query preprocessor spatially averages the ROI pooled feature to generate a preprocessed query.

In other implementations, the query preprocessor applies a 1×1 convolution to the ROI pooled feature to generate a feature map that includes a plurality of cells and concatenates the cells of the feature map to generate the preprocessed query.

Each action transformer layer in the neural network 130 includes one or more attention units 210. In the example of FIG. 2, the neural network 130 includes three action transformer layers that each include two attention units 210. However, in general, the neural network 130 can have more or fewer than three transformer layers and each layer can have the same or different numbers of attention units 210.

Generally each of the one or more attention units 210 in any given layer is configured receive input query features 212 for the action transformer layer and to generate output query features 214.

The input query features 212 for the first action transformer layer in the stack are the input query feature vector generated by the neural network 130.

The input query features 212 for each action transformer layer in the stack other than the first action transformer layer are generated based on the output query features for each attention unit 210 in the preceding action transformer layer in the stack.

For example, when the preceding layer has multiple attention units 210, the input query features 212 can be a concatenation of the output query features for each attention unit 210 in the preceding action transformer layer in the stack.

Similarly, the final feature vector 230 is a concatenation of the output query features for each attention unit in the last action transformer layer in the stack.

To generate the output query features 214, each unit 210 is configured to generate, from the feature representation 112, key features and value features. In particular, the unit 210 can apply a first learned linear transformation to the feature representation 112 to generate the key features and apply a second learned linear transformation to the feature representation 112 to generate the value features. Generally, both the key features and the value feature include a respective feature for each cell in each frame in the feature representation 112. For example, when the feature representation includes T' video frames that have dimensions H'×W', both the key and value features may be of dimension T'×H'×W'×D, with D being equal to the number of dimensions in the query feature vector.

Each unit 210 then applies an attention mechanism to the input query features, the key features, and the value features to generate initial updated query features and generates output query features from the updated query features.

Generally, any attention mechanism may be implemented by the units 210. In the example of FIG. 2, the attention mechanism is a softmax attention mechanism.

In softmax attention, dot-product attention is applied over the key features to generate a respective weight for each of the features in the value features. The weights are then normalized by the square root of D and a softmax is applied to the normalized weights to generate a respective probability for each of the features in the value features. The value features are then summed, weighted by their respective probabilities to generate the initial updated query features.

The operations of any given unit 210 to generate the initial updated query features can therefore be denoted as:

$$a_{xyt}^{(r)} = \frac{Q^{(r)} K_{xyt}^T}{\sqrt{D}}; A^{(r)} = \Sigma_{x,y,t}\left[\text{Softmax}(a^{(r)})\right]_{xyt} V_{xyt},$$

where (r) denotes the r-th candidate bounding box, $Q^{(r)}$ is the input query feature features for the r-th candidate bounding box for the unit 210, $\alpha_{xyt}^{(r)}$ is the normalized weight for the value feature $V_{xyt}$ that has temporal index t and spatial indices x and y in the T'×H'×W'×D value features, $K_{xyt}$ is the key feature that has temporal index t and spatial indices x and y in the T'×H'×W'×D key features, and $A^{(r)}$ is the initial updated query feature for the r-th candidate bounding box.

The unit 210 can then generate the output query features 214 from the initial updated query features in any of a variety of ways. In the example of FIG. 2, during training, the unit applies a dropout to the initial updated query features and adds them to the original query features. The resulting query features are passed through a residual branch consisting of a LayerNorm (layer normalization) operation, followed by a Feed Forward Network (FFN) implemented as a 2-layer MLP and dropout. The final feature is added to the output of the LayerNorm operation and passed through one more LayerNorm operations to generate the output query features 214.

After training, the dropout operation can be removed and the unit 210 can generate the output query features 214 from the initial updated query features without dropping out any features. Thus, after training, the unit 210 processes the updated query features and the input query features through a residual branch that includes a layer normalization operation followed by one or more fully-connected neural network layers to generate initial output query feature and applies layer normalization to the initial output query features to generate the output query features 214.

Thus, each action transformer layer in the stack updates initial query features generated based on the candidate bounding box by applying an attention mechanism that uses keys and values derived from the feature representation 112. By updating the query features in this manner, the self-attention applied by the action transformer layers adds context from other agents and objects in the video clip to the query vector, to aid with the subsequent classification and regression.

The action transformer neural network 130 also includes one or more classification output layers configured to process the final feature vector 230 to perform N+1 way classification generate a respective classification score for each action in a set of N possible actions that represents a likelihood that the person depicted in the candidate agent bounding box is performing the action in the video clip and a score for a "background" action that represents the likelihood that the region in the image actually depicts the background or an agent not performing an action.

When the neural network 130 generates refined bounding boxes 250, the neural network 130 also includes one or more regression output layers configured to process the final feature vector for the candidate bounding box to generate data defining a final bounding box that is a refined estimate of the portion of the key video frame that depicts the agent, i.e., that refines the estimate generated by the region proposal neural network 120. For example the regression output layers can generate a vector that includes a refinement to each coordinate of the bounding box generated by the region proposal neural network 120.

To allow the neural network 130 to generate accurate action classifications, the system 100 (or another system) trains the neural network 130 on a set of training data, i.e., on a set of labeled video clips, to determine trained values of the parameters of the neural network 130. When the system uses the neural networks 110 and 120, the system can pre-train the neural network 110, the neural network 120, or both, while initializing the parameters of the neural network 130 from scratch and any other neural networks that aren't pre-trained from scratch, e.g., according to a conventional parameter initialization scheme. The system can then jointly train the neural networks 110, 120, and 130 on the training data.

For this training, the system can minimize a loss function that includes a classification loss and a regression loss. The classification loss can be a separate logistic loss for each action class, implemented using sigmoid cross-entropy. The regression loss can be an L1 error-based loss, e.g., the smooth L1 loss.

Figure 3:
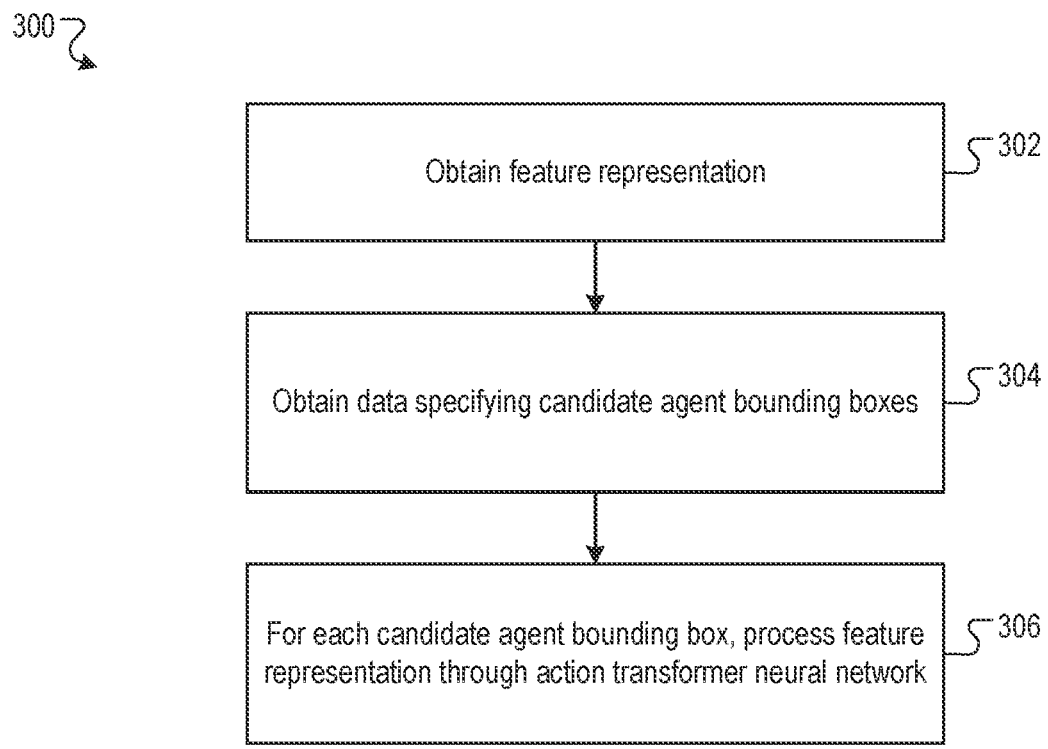
FIG. 3 is a flow diagram of an example process for generating an action classification for a video clip.

FIG. 3 is a flow diagram of an example process 300 for classifying actions performed in a key frame. For convenience, the process 300 will be described as being performed by a system of one or more computers located in one or more locations. For example, a video processing system, e.g., the video processing system 100 of FIG. 1, appropriately programmed, can perform the process 300.

The system obtains a feature representation of a video clip that includes the key frame and one or more context frames (step 302).

The system obtains data specifying a plurality of candidate agent bounding boxes in the key video frame, wherein each candidate agent bounding box is an initial estimate of a portion of the key video frame that depicts an agent (step 304).

For each candidate bounding box, the system processes the feature representation through an action transformer neural network (step 306).

The action transformer neural network includes a stack of action transformer layers configured to process the feature representation to generate a final query feature vector for the candidate bounding box and one or more classification output layers configured to process the final feature vector to generate a respective classification score for each action in a set of possible actions that represents a likelihood that the person depicted in the candidate agent bounding box is performing the action in the video clip. The action transformer neural network can also include one or more regression output layers configured to process the final feature vector for the candidate bounding box to generate data defining a final bounding box that is a refined estimate of the portion of the key video frame that depicts the agent.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
obtaining a feature representation of a video clip comprising a key video frame from a video and one or more context video frames from the video;
obtaining data specifying a plurality of candidate agent bounding boxes in the key video frame, wherein each candidate agent bounding box is an initial estimate of a portion of the key video frame that depicts an agent; and
for each candidate agent bounding box:
processing the feature representation through an action transformer neural network, wherein the action transformer neural network comprises:
a stack of action transformer layers configured to process the feature representation to generate a final query feature vector for the candidate agent bounding box, wherein each action transformer layer is configured to:
for each of one or more attention units:
receive input query features for the action transformer layer,
generate, from the feature representation, key features,
generate, from the feature representation, value features,
apply an attention mechanism to the input query features, the key features, and the value features to generate initial updated query features; and
generate output query features from the initial updated query features, wherein:
the input query features for the first action transformer layer in the stack are features corresponding to the candidate agent bounding box in the feature representation,
the input query features for each action transformer layer in the stack other than the first action transformer layer are generated based on the output query features for each attention unit in the preceding action transformer layer in the stack, and
the final query features are generated based on the output query features for each attention unit in the last action transformer layer in the stack; and
one or more regression output layers configured to process a final feature vector composed of the final query features for the candidate agent bounding box to generate data defining a final bounding box that is a refined estimate of the portion of the key video frame that depicts the agent.

2. The method of claim 1, wherein generating, from the feature representation, key features comprises:
applying a first learned linear transformation to the feature representation.

3. The method of claim 1 wherein generating, from the feature representation, value features comprises:
applying a second learned linear transformation to the feature representation.

4. The method of claim 1, further comprising generating the features corresponding to the candidate agent bounding box in the feature representation, comprising:
extracting a region of interest (ROI) pooled feature for the candidate agent bounding box from the feature representation.

5. The method of claim 4, wherein the generating further comprises:
processing the ROI pooled feature using a query preprocessor followed by one or more linear layers.

6. The method of claim 5, wherein the query preprocessor spatially averages the ROI pooled feature.

7. The method of claim 5, wherein the query preprocessor applies a 1×1 convolution to the ROI pooled feature to generate a feature map comprising a plurality of cells and concatenates the cells of the feature map.

8. The method of claim 1, wherein the attention mechanism is a softmax attention mechanism.

9. The method of claim 1, wherein the input query features for each other action transformer layer are a concatenation of the output query features for each attention unit in the preceding action transformer layer in the stack.

10. The method of claim 1, wherein the final query features are a concatenation of the output query features for each attention unit in the last action transformer layer in the stack.

11. The method of claim 1, wherein generating output query features from the updated query features comprises:
processing the updated query features and the input query features through a residual branch that comprises a layer normalization operation followed by one or more fully-connected neural network layers to generate initial output query features; and
applying layer normalization to the initial output query features to generate the output query features.

12. The method of claim 1, wherein obtaining the feature representation of the video clip comprises:
processing the video clip through a base neural network comprising a plurality of three-dimensional convolutional layers.

13. The method of claim 1, wherein obtaining data specifying a plurality of candidate agent bounding boxes in the key video frame comprises:
processing a temporally-central frame corresponding to the key video frame in the feature representation using a region proposal neural network to generate a first plurality of candidate agent bounding boxes and, for each candidate agent bounding box in the first plurality, an objectness score.

14. The method of claim 13, wherein obtaining data specifying a plurality of candidate agent bounding boxes in the key video frame further comprises:
selecting a pre-determined number of candidate agent bounding boxes from the first plurality based on the objectness scores.

15. One or more non-transitory computer-readable storage media storing instructions that when executed by one or more computers cause the one or more computers to perform operations comprising:
obtaining a feature representation of a video clip comprising a key video frame from a video and one or more context video frames from the video;
obtaining data specifying a plurality of candidate agent bounding boxes in the key video frame, wherein each candidate agent bounding box is an initial estimate of a portion of the key video frame that depicts an agent; and
for each candidate agent bounding box:
processing the feature representation through an action transformer neural network, wherein the action transformer neural network comprises:
a stack of action transformer layers configured to process the feature representation to generate a final query feature vector for the candidate agent bounding box, wherein each action transformer layer is configured to:
for each of one or more attention units:
receive input query features for the action transformer layer,
generate, from the feature representation, key features,
generate, from the feature representation, value features,
apply an attention mechanism to the input query features, the key features, and the value features to generate initial updated query features; and
generate output query features from the initial updated query features, wherein:
the input query features for the first action transformer layer in the stack are features corresponding to the candidate agent bounding box in the feature representation,
the input query features for each action transformer layer in the stack other than the first action transformer layer are generated based on the output query features for each attention unit in the preceding action transformer layer in the stack, and
the final query features are generated based on the output query features for each attention unit in the last action transformer layer in the stack; and
one or more regression output layers configured to process a final feature vector composed of the final query features for the candidate agent bounding box to generate data defining a final bounding box that is a refined estimate of the portion of the key video frame that depicts the agent.

16. A system comprising one or more computers and one or more storage devices storing instructions that when executed by one or more computers cause the one or more computers to perform operations comprising:
obtaining a feature representation of a video clip comprising a key video frame from a video and one or more context video frames from the video;
obtaining data specifying a plurality of candidate agent bounding boxes in the key video frame, wherein each candidate agent bounding box is an initial estimate of a portion of the key video frame that depicts an agent; and
for each candidate agent bounding box:
processing the feature representation through an action transformer neural network, wherein the action transformer neural network comprises:
a stack of action transformer layers configured to process the feature representation to generate a final query feature vector for the candidate agent bounding box, wherein each action transformer layer is configured to:
for each of one or more attention units:
receive input query features for the action transformer layer,
generate, from the feature representation, key features,
generate, from the feature representation, value features,
apply an attention mechanism to the input query features, the key features, and the value features to generate initial updated query features; and
generate output query features from the initial updated query features, wherein:
the input query features for the first action transformer layer in the stack are features corresponding to the candidate agent bounding box in the feature representation,
the input query features for each action transformer layer in the stack other than the first action transformer layer are generated based on the output query features for each attention unit in the preceding action transformer layer in the stack, and
the final query features are generated based on the output query features for each attention unit in the last action transformer layer in the stack; and
one or more regression output layers configured to process a final feature vector composed of the final query features for the candidate agent bounding box to generate data defining a final bounding box that is a refined estimate of the portion of the key video frame that depicts the agent.

17. The system of claim 16 wherein generating, from the feature representation, key features comprises:
applying a first learned linear transformation to the feature representation.

18. The system of claim 16 wherein generating, from the feature representation, value features comprises:
applying a second learned linear transformation to the feature representation.

* * * * *